3,116,336
ALKYLATION PROCESS
John L. Van Winkle, San Lorenzo, Calif., assignor to Shell Oil Company, New York, N.Y., a corporation of Delaware
No Drawing. Filed June 6, 1960, Ser. No. 33,902
8 Claims. (Cl. 260—624)

This invention relates to the preparation of ortho-alkyl-substituted phenols. More particularly, the invention relates to a process for introducing alkyl groups onto the aromatic ring of phenols in a position ortho to the hydroxyl group and to novel catalysts which are employed in the process.

The presence of the hydroxy group on the benzene ring in such compounds as phenol tends to control the further substitution on the ring in such a way that subsequent substitutions on the hydroxybenzene ring take place on ring carbon atoms in the ortho and para positions relative to the hydroxyl group. In phenol, the activating influence of the sole hydroxyl group renders the ring ortho- and para-positions active in different degrees and, in general, the para position is more active. In alkylation, for example, it is well known that in the conventional Friedel-Crafts reaction phenol is first monoalkylated in the 4-position and the subsequent dialkylphenol is the 2,4-disubstituted product. Furthermore, the conventional Friedel-Crafts alkylation of phenol produces mixtures of products wherein the predominant compounds are the 4-alkyl, 2,4-dialkyl and 2,4,6-trialkylphenol.

Substituted alkylphenols have considerable industrial utility because of their antioxidant properties. Particularly useful compounds of this type are the 2,6-dialkylphenols, particularly those wherein at least one of the alkyl substituents is branched on the alpha carbon atom, e.g., 2-methyl-6-tert-butylphenol; 2,6-diisopropylphenol and 2,6-di-tert-butylphenol. While such compounds are presently of considerable commercial importance, they have been expensive because they are produced by conventional alkylation processes in undesirably small quantities and as components in mixtures of para-alkylated phenols. Furthermore, these processes are complicated by the formation of such extraneous products as isomeric ethers which reduce the yield and render product recovery more difficult.

It is an object of this invention to provide a process for selectively ortho-alkylating phenols. It is a further object of the invention to provide such a process employing certain inexpensive readily available sulfur compounds. Another object of the invention is the provision of a selective ortho-alkylation process for phenols having a replaceable hydrogen atom on the para ring carbon atom, which can be conducted under moderate conditions of temperature and pressure. Still a further object of the invention is the provision of a process which employs certain relatively inexpensive and effective sulfur catalysts. The provision of such a process for providing high yields of ortho-alkylated phenols in comparatively short reaction times is another object of the invention. Other objects will be apparent from the following description of the invention.

These objects are accomplished in the invention by the process for selectively ortho-alkylating a phenol which comprises reacting together an olefin and a phenol, said phenol having a replaceable hydrogen atom on the ring carbon atom para to the hydroxyl group and on at least one of the ring carbon atoms ortho to the hydroxyl group, the olefin/phenol ratio being at least about 2:1, at a temperature of at least about 100° C., in the presence of a catalytic amount of a sulfur compound selected from the group consisting of dialkyl sulfate; alkyl-sulfonic acid; benzenesulfonic acid; 3,6-dihydroxy-1,4-benzenesulfonic acid; and naphthalenesulfonic acid.

By conducting the process under these conditions it has unexpectedly been found that the principal products of the reaction are mono-ortho and diorthoalkylphenols, and para-alkylation of the aromatic ring or rings occurs only after both ortho positions have been alkylated. This discovery is, of course, surprising in view of the extensive showing in the art that when sulfuric acid is employed to catalyze the alkylation of phenols with olefins, the first and principal product is the 4-alkylphenol, the ortho positions being difficult to substitute even after the para position has been filled.

The phenols which are selectively alkylated by the process of the invention are those hydroxyaromatic compounds having one or more aromatic rings and at least one hydroxyl or OH group disposed on at least one of the rings. Such compounds include hydroxybenzenes, hydroxynaphthalenes, hydroxyanthracenes, hydroxyphenanthrenes, and the like. The phenol used can have other ring substituents, preferably alkyl. Of the various phenols, the preferred compounds are those having up to three condensed rings in the nuclear portion of the molecule. Particularly preferred are the monohydroxybenzenes, exemplified by phenol, o-cresol, 2,5-xylenol and the like. One class of o-alkyl reactants of particular interest is that wherein the alkyl substituents have up to 8 carbon atoms, e.g., o-ethylphenol, o-isopropylphenol, o-hexylphenol, o-tert-amylphenol, o-octylphenol and the like. However, the phenol reactant of the process must have, on the hydroxylated ring, a replaceable hydrogen atom on the ring carbon atom para to the hydroxyl group and on at least one of the ring carbon atoms ortho to the hydroxyl group.

The olefinic reactants which are employed to ortho-alkylate the phenol of the type described are the unsaturated hydrocarbons having one or more olefinic double bonds. Preferred olefins are those compounds having up to two olefinic, i.e., non-aromatic, double bonds and from two to twenty carbon atoms. The olefins may be acyclic, as in the case of ethylene, propylene, butylene, butadiene, isobutylene, amylene, hexylene, isoprene, dodecene, eicosene, and the like, or they may be cyclic, e.g., cyclopentene, cyclohexene. The olefins may also have aromatic substituents, as exemplified by styrene, alpha-methylstyrene, divinylbenzene, allylbenzene, and the like. Of these olefins, the most preferred class, which affords alkylphenols having the most desirable propreties, are the mono-olefins having from two to eight carbon atoms. Particularly preferred members of this class of mono-olefins are those acyclic mono-olefins having from 3 to 5 carbon atoms, e.g., propylene, butylene, isobutylene, amylene and isoamylene, since these compounds are the most reactive under the conditions of this process.

The phenol and the olefin are reacted together under particular alkylating conditions to yield the desired ortho-alkylphenols. It has been found that the selectivity of the process is the result as much of the conditions employed as of the catalyst used. Thus, the reaction conditions, i.e., concentration of reactants, temperature and pressure, are of great significance in determining the distribution of alkylated phenolic products obtained.

The selective nature of the process is obtained when relatively large excesses of the olefin are employed. Molar amounts of at least two moles of olefin per mole of phenol have been found to be necessary, and molar amounts of at least three moles of olefin per mol of the phenol are preferred. The use of more than about six moles of olefin per mole of phenol tends to unnecessarily dilute the reaction system and increase reaction time, and is therefore uneconomical. Because of the desirability of conducting the alkylation in the presence of an excess of olefin, it is desirable to bring the reactants together very quickly as, for example, by charging the gaseous or liquid olefin to the phenol in a very short time so that an excess of the former is present in the reaction zone during the reaction. Alternatively, the phenol may be charged to a reaction zone already containing the olefinic reactant.

The selective alkylation takes place at a temperature of at least about 100° C., and preferably at temperatures between about 100° C. and about 250° C. At lower temperatures the reaction rate tends to be undersirably low, while at higher temperatures dealkylation and rearrangement of the products takes place at a competitive rate. While for many of the olefinic reactants the alkylation proceeds at a desirable rate at these temperatures at atmospheric pressure, the use of superatmospheric pressure is helpful when olefins which are gases at these temperatures are employed, particularly such lower olefins as ethylene, propylene, isobutylene, cyclohexece and the like are used. As a consqeuence, it is frequently convenient to conduct the alkylation at pressure above atmospheric. The presure required is that sufficient to maintain the reactants in liquid form. This may be accomplished merely by conducting the reaction in a sealed volume such that the sum of the partial pressures of the reactants therein at the reaction temperature is greater than atmospheric. Alternatively, the reaction zone may be pressured with an excess of the reactant olefin, e.g., isobutylene, or with a gas inert under the reaction conditions, such as nitrogen, carbon dioxide, argon or helium. Conveniently, superatomspheric pressures greater than about 100 p.s.i.g. may be employed, while pressures from about 100–3000 p.s.i.g. may be used in conventional equipment.

The reaction is preferably conducted under non-ionic, substantially anhydrous conditions. While traces of water, such as those normally present in the reactants and catalyst, can be tolerated, it is desirable to keep the total concentration in the reaction system below about 5% w., and preferably below about 1% w. Thus, while special predrying of reactants and catalyst is not normally required, reasonable precautions should be taken to avoid the introduction or buildup of water in the reaction equipment.

As important as the selection of the noted reaction conditions is the use of the particular sulfur compounds which have been found to catalyze the selective ortho-alkylation under these conditions. The catalyst is selected from the group of sulfur compounds consisting of dialkyl sulfate; alkanesulfonic acid; benzenesulfonic acid; 3,6 - dihydroxy - 1,4 - benzenedisulfonic acid; and naphthalenesulfonic acid. Of these catalysts, the preferred catalyst, which has been found to give best yields under the reaction conditions, is that methyl compound selected from dimethyl sulfate and methanesulfonic acid. These catalysts are all relatively inexpensive compounds commercially available and, when employed in catalytic amounts, are sufficiently non-corrosive as not to require special glass- or stainless steel-lined reaction equipment.

It has been observed that only very small catalytic amounts of these compounds are required. The amount of catalyst required in a particular reaction will, of course, be determined by the temperature and pressure at which the reaction is conducted, the nature, activity and concentration of the reactants, and the nature of the particular sulfur compound used. Thus, at higher temperatures and pressures, somewhat smaller amounts of catalyst are reqired than at lower temperatures. Generally, the amount of sulfur compound used should be between about 0.001 mole and about 0.1 mole, based on the phenol, with about 0.005 to about 0.05 mole being preferred.

This comparatively small amount of catalyst required is, it should be noted, one of the advantages of the invention in that the product is easily purified of these trace amounts. Furthermore, in these low concentrations, the sulfur compounds do not present significant material corrosion problems.

The dialkyl sulfate catalyst is that class of sulfur compounds having the general formula $(RO)_2SO_2$, wherein each R is an alkyl radical, preferably a lower alkyl radical having up to 4 carbon atoms. These sulfates are diesters of sulfuric acid; typical compounds are dimethyl sulfate, diethyl sulfate, dipropyl sulfate, diisopropyl sulfate, and dibutyl sulfatte. Of these, as noted above, the preferred member is dimethyl sulfate.

The alkanesulfonic acids having the formula $RSO_3H$ wherein R has the above significance. Representative compounds are methanesulfonic acid, ethanesulfonic acid, propanesulfonic acid and butanesulfonic acid. They are difficult to maintain in the anhydrous state and are generally obtained and employed in hydrated form. Of the noted compounds, the preferred member is methanesulfonic acid.

The other sulfur catalysts found to direct the selective ortho-alkylation of the invention are the arylsulfonic acids selected from the group consisting of benzenesulfonic acid; 1,4-dihydroxy-3,6-benzenedisulfonic acid and naphththalenesulfonic acid. Either alpha-napthalenesulfonic acid or beta-naphthalenesulfonic acid is suitable. Suprisingly, it has been found that while these enumerated compounds have superior ortho-directing properties, their alkyl-substituted homologs do not. For example, although benzenesulfonic acid is an excellent catalyst under the conditions of the reaction, p-toluenesulfonic acid is devoid of o-directing properties under the same conditions. The catalyst is conveniently introduced into the reaction zone by premixing it with the phenolic reactant. In general, all of the catalysts employed are liquids or low-melting solids which are readily mixed with the phenolic reactant. For example, when phenol is employed, the catalyst may readily be dispersed in molten phenol, and the resulting mixture charged to the reaction zone. In this way, excellent intermixing of the reactants and catalyst is achieved.

When the process is conducted in accordance with the above description, it takes place in extremely short times, generally from fifteen minutes to two hours. The process may be employed for the production of mono-ortho-alkylphenols from phenols having replaceable hydrogen atoms on all three of the ring carbon atoms ortho and para to the hydroxyl group, in which case the reaction time is very short. Alternatively, it may be employed for preparation of the more useful 2,6-dialkylphenols from the non-ortho-substituted and mono-ortho-substituted phenols described above. When the 2,6-dialkylphenol is the desired product, it is preferably separated from the reaction mixture during the time when it is in greatest concentration and before p-alkylation to the 2,4,6-trialkylphenol takes place.

The period when this separation is most conveniently accomplished is delineated by two times, $t_1$ and $t_2$. At time $t_1$, the molar concentration of the desired 2,6-dialkyl product is at a maximum relative to the concentration in the reaction mixture of the other alkylated products produced. At this time, the absolute concentration of the 2,6-dialkyl product is increasing, but the rate of production of the other product is also increasing, in such a manner that the by-product reactions are producing competitive products in significant quantities. The concentration of these by-products after $t_1$ is thus increasing faster than the concentration of the desired 2,6-dialkyl product. The time $t_1$ can be analytically determined by measuring the time at which the ratio of the molar concentrations $$\frac{2,6\text{-dialkylphenol}}{2,6\text{-dialkylphenol}+4\text{-alkylphenol}+2,4\text{-dialkylphenol}+2,4,6\text{-dialkylphenol}}$$

reaches a maximum.

While at this point $t_1$ the absolute concentration of the desired 2,6-dialkylphenol is continuing to increase in the reaction mixture, after some subsequent time $t_2$ the 2,6-dialkylphenol will begin to be converted in significant amounts to the 2,4,6-trialkylphenol, thus reducing the concentration of the 2,6-disubstituted compound. At this time $t_2$ the concentration of the 2,6-dialkylphenol is at a maximum, and after $t_2$ the desired product is being lost to the undesired trialkyl compound. Although considerable amounts of the 2,6-dialkylphenol remain in the reaction mixture after the time $t_2$, the increasing concentration of the unwanted by-products coupled with the decline in the absolute concentration of the 2,6-dialkyl product, render recovery of the latter less economically attractive.

As a consequence, the times for recovering the desired 2,6-dialkylphenol in maximum yield are determined by times $t_1$ and $t_2$. Naturally, the absolute times after the start of a batch reaction for the conditions represented by $t_1$ and $t_2$ to occur will depend on all of the process variables described above.

The reaction may be conducted in a batchwise manner, preferably by adding the phenolic reactant containing the catalyst to a reactor and rapidly passing in the olefinic reactant under conditions where maximum mixing of the reactants is achieved. Since the olefinic alkylating agents of the invention are generally gases or liquids under the reaction conditions, they can readily be added to the heated phenolcatalyst mixture as fast as they can be absorbed, while maintaining the required excess of olefin.

Alternatively, the alkylation may be conducted in a continuous manner, by passing streams containing the catalyst and reactants through a reaction zone where they are subjected to the necessary conditions of mixing, heat and pressure for a time sufficient to produce the desired 2-alkylated or 2,6-dialkylated product in suitable yield. In the continuous process, the unreacted phenolic and olefinic reactant can readily be recovered and recycled to the beginning of the reaction zone and the alkylated by-products can be recovered, dealkylated, recycled or otherwise employed.

The reaction may be readily stopped at the desired time by such conventional methods as cooling, separating the reactants, or neutralizing the catalyst. The latter is easily accomplished by adding aqueous caustic to the system and thus both cooling it and killing the catalyst, preventing isomerization, transalkylation and disproportionation.

The reaction products may be separated at the termination of the process by such well-known methods as fractional distillation, selective extraction, as with caustic, and similar methods. The 2-alkyl or 2,6-dialkyl product so recovered may then be employed as an anti-oxidant itself, or as an intermediate in the preparation of other antioxidants. Typical products obtained by the process of the invention include 2-isopropylphenol from propylene and phenol; 2,6-di-tert-amylphenol from isoamylene and phenol; 2-methyl-6-tert-butylphenol from o-cresol and isobutylene; 3-methyl-6-cyclohexylphenol from m-cresol and cyclohexene; 2,6-dibenzylphenol from phenol and styrene; 2-methyl-6-alpha-cumylphenol from o-cresol and alpha-methylstyrene; 2-dodecylnaphthol-1 from naphthol-1 and decene-1; 2-tert-butylanthrol-1 from anthrol-1 and isobutylene; and 2-methyl-3-ethylphenol from o-cresol and ethylene.

The following examples will illustrate the nature and advantages of the process of the invention. It should be understood, however, that the examples are merely illustrative and are not to be regarded as limitations to the appended claims, since the basic teachings thereof may be varied at will as will be understood by one skilled in the art.

EXAMPLES

The following runs were conducted in a one-liter stainles steel horizontal stirred autoclave reactor employing phenol and isobutylene. The isobutylene employed was very pure, on the order of 99+%, and was prepared by catalytic dehydration of tertiary butyl alcohol. Analytical grade phenol containing about 0.5% w. water and 0.15% w. $H_3PO_2$ (as preservative) was employed.

The candidate catalysts were first dissolved in melted phenol, and the resulting mixture was charged to the reactor and warmed to 150° C. with stirring. Liquid isobutylene was then charged under pressure into the reactor during a 10–20 second period. The reaction temperature was maintained at about 150° C. for the duration of the reaction.

During the course of the reaction, small samples were withdrawn from the reactor at various time intervals and analyzed. The analyses were conducted by gas-liquid partition chromatography, on a 2½ meter x 6 mm. glass column packed with 80–100 mesh Chromasorb W impregnated with 20% DC–710 silicon oil, run at 197° C. with a helium flow of 60 cc./min.

Examples 1–9, conducted in this manner are set forth in Table I.

Table I

| Example | Catalyst | Charge | | | Alkylation temp., °C. | Alkylation time, min. | Composition of alkylate, mole percent | | | | | | | | Percent yield of 2,6-di-t-butylphenol |
|---|---|---|---|---|---|---|---|---|---|---|---|---|---|---|---|
| | | Moles isobutylene | Moles phenol | Moles catalyst | | | Phenol | t-Butyl ether of phenol | 2-t-butylphenol | 4-t-butylphenol | t-Butyl ether of 2-t-butylphenol | 2,6-di-t-butylphenol | 2,4-di-t-butylphenol | 2,4,6-tri-t-butylphenol | |
| 1 | None | 3.0 | 1.0 | | 150 | | 100.0 | | | | | | | | 0 |
| 2 | Dimethyl sulfate. | 3.0 | 1.0 | 0.004 | 150 | 100 | 20.1 | 9.3 | 29.9 | 1.6 | 1.2 | 25.2 | 4.6 | 7.8 | 64.2 |
| 3 | Methane-sulfonic acid. | 3.21 | 1.0 | 0.008 | 150 | 60 | 11.1 | 5.2 | 23.7 | .9 | .8 | 35.6 | 6.4 | 16.4 | 60.0 |
| 4 | 3,6-Dihydroxy-1,4-benzene-disulfonic acid. | 3.34 | 1.0 | 0.005 | 150 | 90 | 18.1 | 7.4 | 23.8 | 2.1 | 1.3 | 28.6 | 5.8 | 12.9 | 57.9 |
| 5 | Naphthalene beta-sulfonic acid. | 3.0 | 1.0 | 0.01 | 150 | 17 | 8.8 | 3.1 | 23.7 | 2.1 | .9 | 31.0 | 10.9 | 19.5 | 48.8 |
| 6 | Diisopropyl sulfate. | 3.18 | 1.0 | 0.008 | 150 | 69 | 11.7 | 3.8 | 22.0 | 3.5 | 1.1 | 29.6 | 9.6 | 18.7 | 48.2 |
| 7 | Benzene-sulfonic acid. | 3.0 | 1.0 | 0.01 | 150 | 10 | 4.7 | 7.1 | 24.3 | 2.1 | 2.4 | 29.6 | 11.6 | 18.4 | 48.0 |
| 8 | 98% $H_2SO_4$ | 3.0 | 1.0 | 0.005 | 150 | 60 | 10.4 | 2.0 | 23.0 | 3.7 | 1.1 | 24.5 | 14.2 | 21.2 | 38.5 |
| 9 | p-Toluene-sulfonic acid. | 3.0 | 1.0 | 0.02 | 150 | 16 | 13.0 | 4.1 | 15.8 | 2.5 | .5 | 12.6 | 33.0 | 18.6 | |
| 10 | 65% $H_2SO_4$ | 3.0 | 1.0 | 0.00064 | 150 | 64 | 64.1 | 22.4 | 10.2 | 1.5 | 1.1 | .5 | .1 | 0 | |

Table II

| Example | Moles Dimethyl Sulfate | Alkylation Temp., °C. | Alkylation Time, Min. | Composition of Alkylate, Mole Percent | | | | | | | Percent Yield of 2,6-Di-t-Butyl-Phenol |
|---|---|---|---|---|---|---|---|---|---|---|---|
| | | | | Phenol | t-Butyl Ether of Phenol | 2-t-Butyl-Phenol | 4-t-Butyl-Phenol | 2,6-di-t-Butyl-Phenol | 2,4-di-t-Butyl-Phenol | 2,4,6-tri-t-Butyl-Phenol | |
| 2 | 0.004 | 150 | 120 | 19.09 | 7.11 | 27.92 | 1.51 | 27.92 | 5.12 | 9.94 | 62.8 |
| 11 | 0.02 | 100 | 390 | 15.25 | 6.08 | 18.42 | 1.39 | 37.12 | 3.86 | 17.0 | 62.6 |
| 12 | 0.02 | 150 | 28.5 | 6.29 | 3.80 | 22.67 | 0.83 | 35.20 | 8.88 | 21.52 | 52.8 |

Table III

| Example | Moles Dimethyl Sulfate | Alkylation Temp., °C. | Alkylation Time, Min. | Phenol | Phenyl Amyl Ether | 2-Amyl-Phenol | 4-Amyl-Phenol | 2,6-di-Amyl-Phenol | 2,4-di-Amyl-Phenol | 2,4,6-Triamyl-Phenol | Percent Yield of 2,6-Diamyl-Phenol |
|---|---|---|---|---|---|---|---|---|---|---|---|
| 13 | 0.02 | 150 | 120 | 9.98 | 1.04 | 34.15 | 3.96 | 14.20 | 26.95 | 9.78 | 25.9 |

In Examples 2 and 11–12, presented in Table II, the effect of varying catalyst concentration and temperature was determined employing the equipment and methods described above.

To illustrate the determination of times $t_1$ and $t_2$, the values in Example 2 of the alkylate molar amount of 2,6-di-tert-butylphenol in column 1 and for the ratio

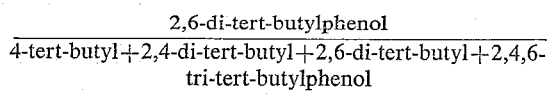

$$\frac{\text{2,6-di-tert-butylphenol}}{\text{4-tert-butyl}+\text{2,4-di-tert-butyl}+\text{2,6-di-tert-butyl}+\text{2,4,6-tri-tert-butylphenol}}$$

in column 2 as a function of time are presented in Table IV below:

Table IV

| Time, Min. | 1 | 2 |
|---|---|---|
| 2.5 | | |
| 16 | 2.53 | 30.4 |
| 31 | 4.29 | 54.4 |
| 51 | 8.96 | 53.2 |
| 60 | 13.25 | 58.2 |
| 70 | 18.29 | 66.4 |
| 81 | 22.9 | 60.7 |
| 100 | 25.22 | 64.2 |
| 120 | 27.92 | 62.8 |

Example 13, the results of which are set forth in Table III, was a run in which phenol was reacted with 2-methyl-butene-2, using an olefin/phenol ratio of 3:1. After a 75-minute reaction time, 14.2% of the phenol had been converted to 2,6-di-tert-amylphenol, yield of the product being 25.9%.

I claim as my invention:

1. The process for selectively di-ortho-alkylating phenol comprising reacting together under substantially anhydrous conditions an olefin and phenol, both the olefin/phenol ratio being at least about 2:1, at a temperature of at least about 100° C. in the presence of from about 0.001 to about 0.1 mole, based on the phenol, dialkyl sulfate, wherein each alkyl radical has up to 4 carbon atoms.

2. The process of claim 1 wherein the sulfur compound is dimethyl sulfate.

3. The process of claim 1 wherein the olefin is isobutylene.

4. The process for selectively di-ortho-alkylating phenol which comprises reacting together under substantially anhydrous conditions an olefin and phenol, the olefin/phenol ratio being at least about 2:1, at a temperature of at least about 100° C., and a pressure of at least about 100 p.s.i.g., in the presence of from about 0.001 to about 0.1 mole, based on the phenol, dialkyl sulfate, wherein each alkyl radical has up to 4 carbon atoms.

5. The process for selectively di-ortho-alkylating phenol which comprises reacting together under substantially anhydrous conditions a mono-olefin having up to five carbon atoms with phenol, the olefin/phenol ratio being at least 2:1, at a temperature of at least about 100° C. and a pressure of at least about 100 p.s.i.g., in the presence of from about 0.001 to about 0.1 mole, based on the phenol, of dimethyl sulfate.

6. The process for selectively di-ortho-alkylating phenol which comprises reacting together under substantially anhydrous conditions isobutylene and phenol, the isobutylene/phenol ratio being at least about 2:1, at a temperature of at least about 100° C. and a pressure of at least about 100 p.s.i.g., in the presence of from about 0.001 to about 0.1 mole, based on the phenol, of dimethyl sulfate.

7. In the selective di-ortho-alkylation of phenol with an olefin under substantially anhydrous conditions at a temperature of at least about 100° C. and a pressure sufficient to maintain the reactants in liquid form, the improvement which comprises conducting the alkylation in the presence of about 0.001 to about 0.1 mole, based on the phenol, of dialkyl sulfate, wherein each alkyl radical has up to 4 carbon atoms.

8. In the selective di-ortho-alkylation of claim 7, the improvement which comprises conducting the alkylation in the presence of a catalytic amount of dimethyl sulfate.

References Cited in the file of this patent

UNITED STATES PATENTS

| 2,014,766 | Isham | Sept. 17, 1935 |
| 2,523,939 | Braidwood | Sept. 26, 1950 |
| 2,655,546 | Stevens et al. | Oct. 13, 1953 |
| 2,836,627 | Neuworth et al. | May 27, 1958 |
| 2,923,745 | Buls et al. | Feb. 2, 1960 |

FOREIGN PATENTS

| 616,829 | Great Britain | Jan. 27, 1949 |